US007836475B2

(12) United States Patent
Angiolillo et al.

(10) Patent No.: US 7,836,475 B2
(45) Date of Patent: Nov. 16, 2010

(54) VIDEO ACCESS

(75) Inventors: Joel S. Angiolillo, Weston, MA (US);
Vittorio Bucchieri, Wakefield, MA (US)

(73) Assignee: Verizon Patent and Licensing Inc.,
Basking Ridge, NJ (US)

( * ) Notice: Subject to any disclaimer, the term of this patent is extended or adjusted under 35 U.S.C. 154(b) by 352 days.

(21) Appl. No.: 11/613,715

(22) Filed: Dec. 20, 2006

(65) Prior Publication Data

US 2008/0155617 A1 Jun. 26, 2008

(51) Int. Cl.
*H04N 7/173* (2006.01)
(52) U.S. Cl. .......................... 725/93; 725/47
(58) Field of Classification Search ............. 725/86–93, 725/47; 715/716
See application file for complete search history.

(56) References Cited

U.S. PATENT DOCUMENTS

| 6,738,980 | B2 * | 5/2004 | Lin et al. ..................... 725/88 |
| 6,870,573 | B2 * | 3/2005 | Yeo et al. .................... 348/569 |
| 7,302,490 | B1 * | 11/2007 | Gupta et al. ................ 709/231 |
| 7,401,351 | B2 * | 7/2008 | Boreczky et al. ............. 725/88 |
| 7,552,387 | B2 * | 6/2009 | Shen et al. .................. 715/716 |
| 2004/0197088 | A1 * | 10/2004 | Ferman et al. ............. 386/117 |

* cited by examiner

*Primary Examiner*—Andrew Y Koenig
*Assistant Examiner*—Aklil Tesfaye

(57) ABSTRACT

A media content instance is provided for display. A plurality of first images are identified associated with locations within a first segment of a media content instance according to a first offset that is one of: a time interval and a number of frames. The first images are retrieved from the media content instance. At least some of the first images are provided for display.

22 Claims, 8 Drawing Sheets

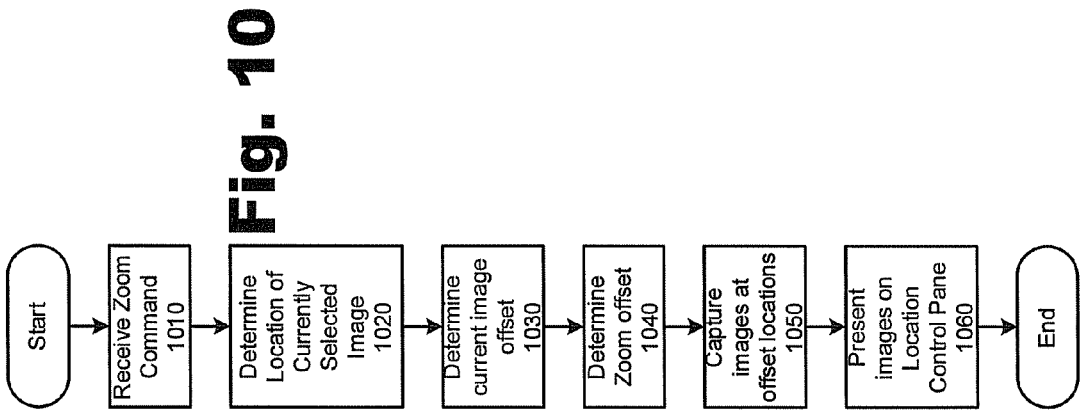
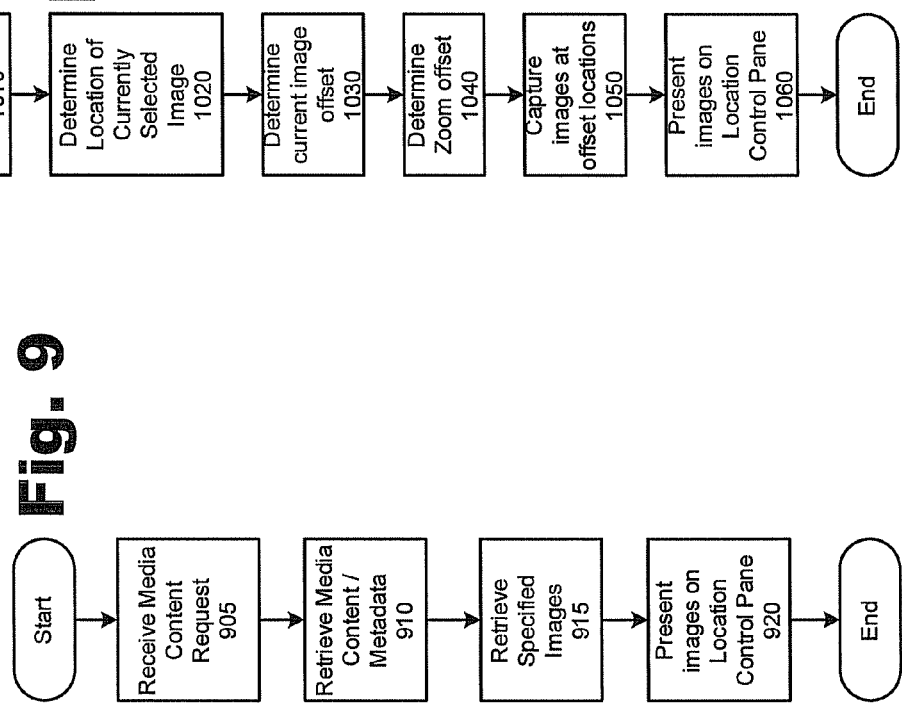
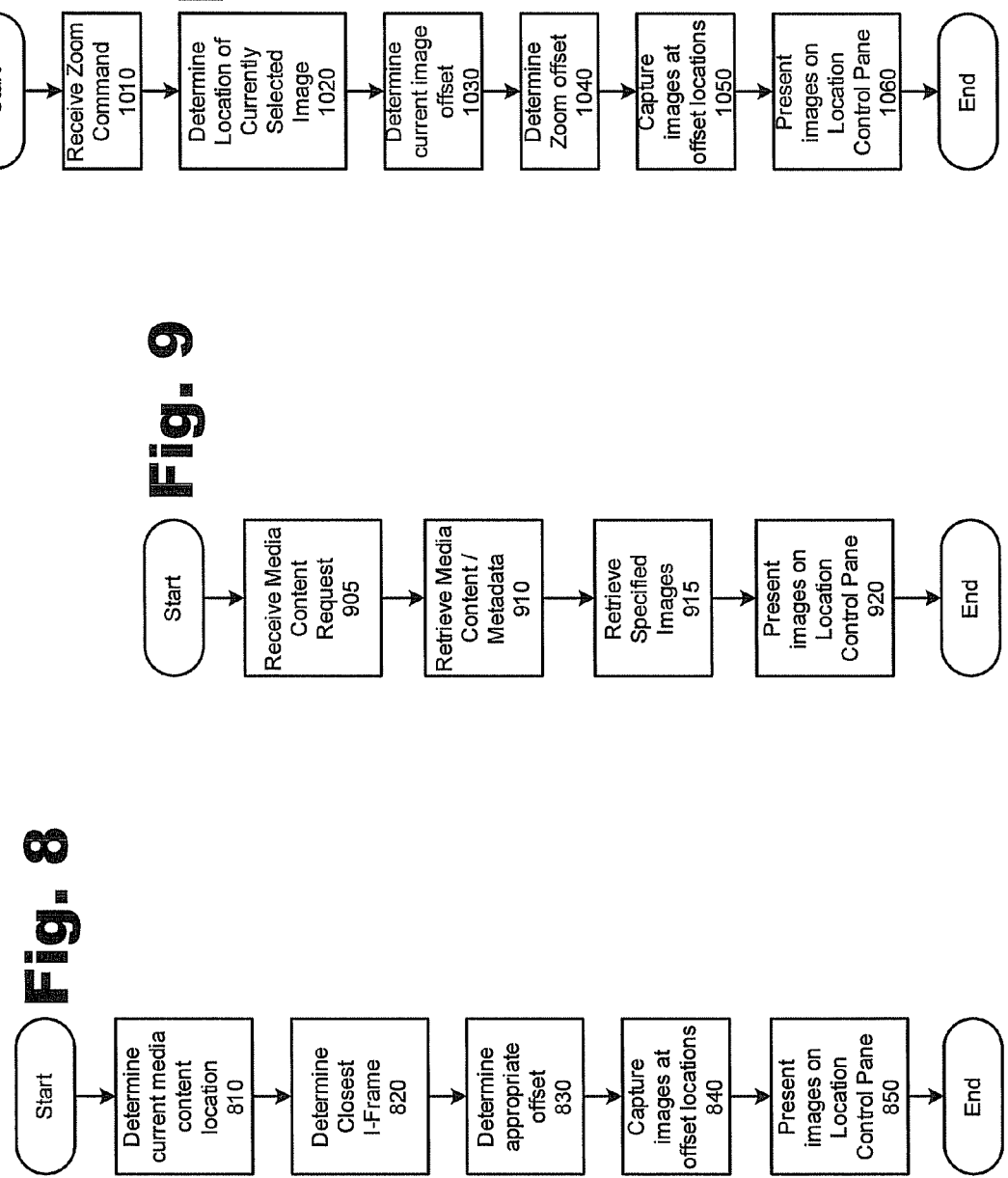

VIDEO ACCESS

BACKGROUND INFORMATION

A variety of enhanced programming, recording, and viewing options may be available for users who access media content such as television programs. In implementing such enhanced programming, content processing devices such as set-top boxes ("STBs") and the like have become important for accessing media content services and media content within those services. For example, in addition to supporting traditional analog broadcast video operations, STBs may also support an increasing number of two-way digital services such as video-on-demand (VOD), internet protocol television ("IPTV"), and personal video recording.

An STB may be used to provide a user with control over media services such as VOD, regular video programming, etc., allowing the user to pause or rewind a television program, or to rewind or fast forward an on-demand video, tracking the status of media playback on screen via a "playback bar" or the like. A video playback bar may display information such as the end time of a program, the portion of a program that has been viewed, and the location of the "read head." A read head indicates a location in the video at which paused video will continue if a "play" option is selected. Other options allow jumping sequentially from one scene of video to another or even from one frame of video to another. Additionally, limited scene selection capabilities accessible from a main menu may be provided from some media, such as digital video discs (DVDs).

Present ways of accessing a particular location within media content are limited. Rewinding or fast-forwarding within media content such as a video file or video program typically involves waiting for the video location to progress from the current location to a desired location, monitored by watching either the on-screen video or the playback bar. Moreover, a location generally cannot be chosen using a "scene selection" option on a DVD while a video is being played. Further, "scene selection" options and the like present users with only a limited number of locations in a video from which locations the user may begin viewing the video.

BRIEF DESCRIPTION OF THE DRAWINGS

The accompanying drawings illustrate various examples and are a part of the specification. The illustrations are merely examples and do not limit the scope of the disclosure. Throughout the drawings, identical reference numbers designate identical or similar elements.

FIG. 8 illustrates an exemplary process for obtaining images for a location access control application.

FIG. 9 illustrates an exemplary process for obtaining images for a control pane according to metadata included in a media content instance.

FIG. 10 illustrates an exemplary process for providing images for a location access control application when a user requests a zoom function.

DETAILED DESCRIPTION

As used herein, the term "media content instance" refers generally to any television program, on-demand program, pay-per-view program, broadcast media program, video-on demand program, Internet Protocol Television ("IPTV"), Digital Video Disc ("DVD") related content, pre-recorded media content, commercial, advertisement, video, multimedia, movie, series of images, audio programming, etc., or any segment, portion, component, or combination of these or other forms of media content that may be presented to and experienced (e.g., viewed) by a user. A media content instance may have one or more components. For example, an exemplary media content instance may include a video component and an audio component.

Figure 1:
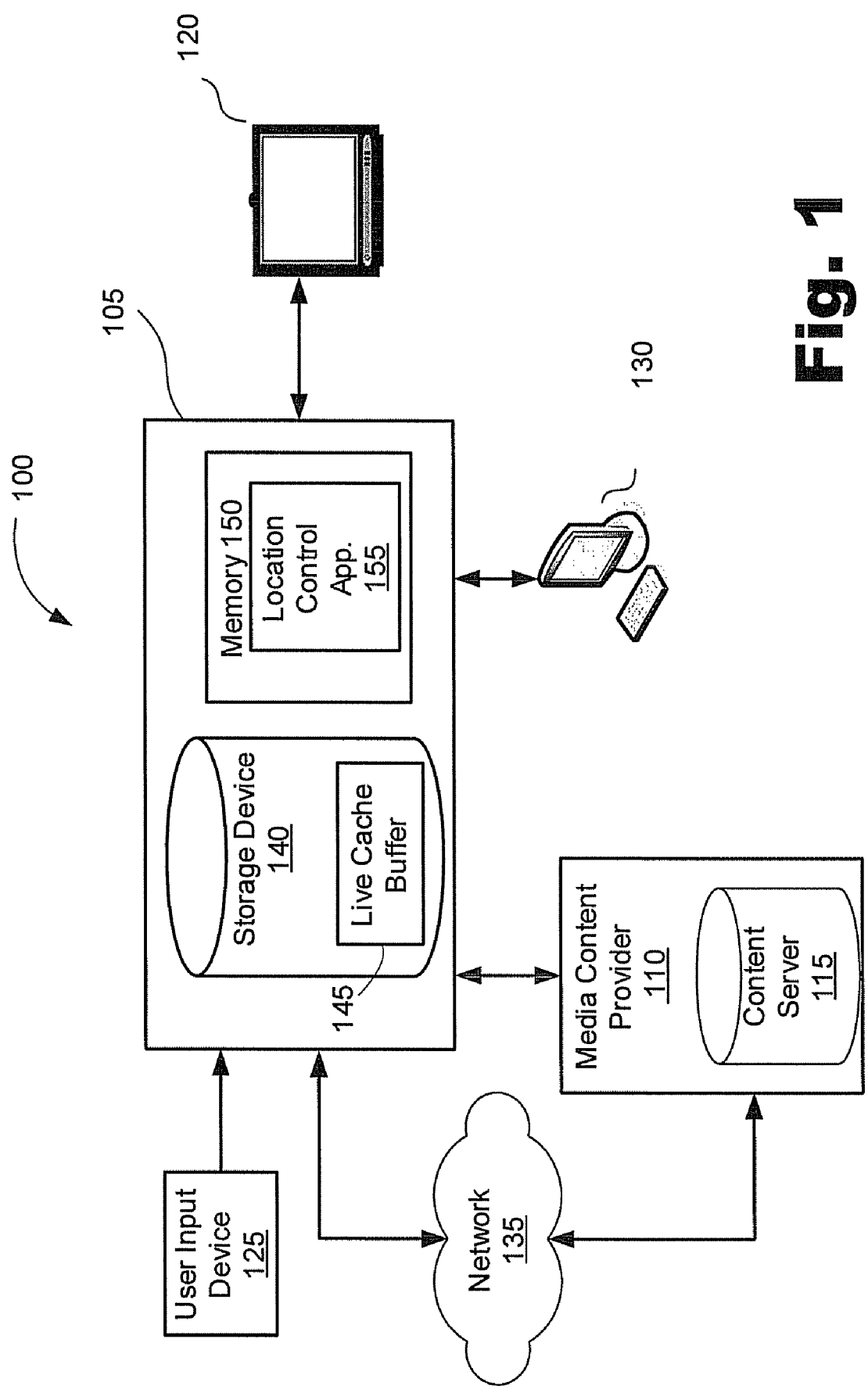
FIG. 1 illustrates an exemplary media content access system.

FIG. 1 illustrates an exemplary media content access system 100. It will be understood that media content access system 100 may take forms, and include elements, other than as illustrated in FIG. 1.

Exemplary media content access system 100 includes a media content processing subsystem 105, which in turn includes a storage device 140 and a live cache buffer 145, as well as a memory 150. A location control application 155 may be stored in and executed from memory 150. Application 155 may be loaded into memory 150 from storage device 140 or may be downloaded via a packet network 135 from a remote computer such as a content server 115, e.g., included within a media content provider 110.

In general, processing subsystem 105 can receive media content from media content provider 110, which may store media on content server 115. The processing subsystem 105 may be configured to process incoming media content, such as by receiving data packets, decoding encoded digital media content, etc. The processing subsystem 105 may further be configured to generate graphics, such as a graphical user interface, to overlay on displayed media content.

Content, e.g., in the form of data packets, may be provided directly from the content provider 110 to the processing subsystem 105, or may alternatively be transmitted through network 135. A user may interact with the processing subsystem 105 through a user input device 125, such as a remote control, or through an additional access device 130. The processing subsystem 105 may be configured to output media to a user display device 120 for experiencing by a user.

Figure 2:
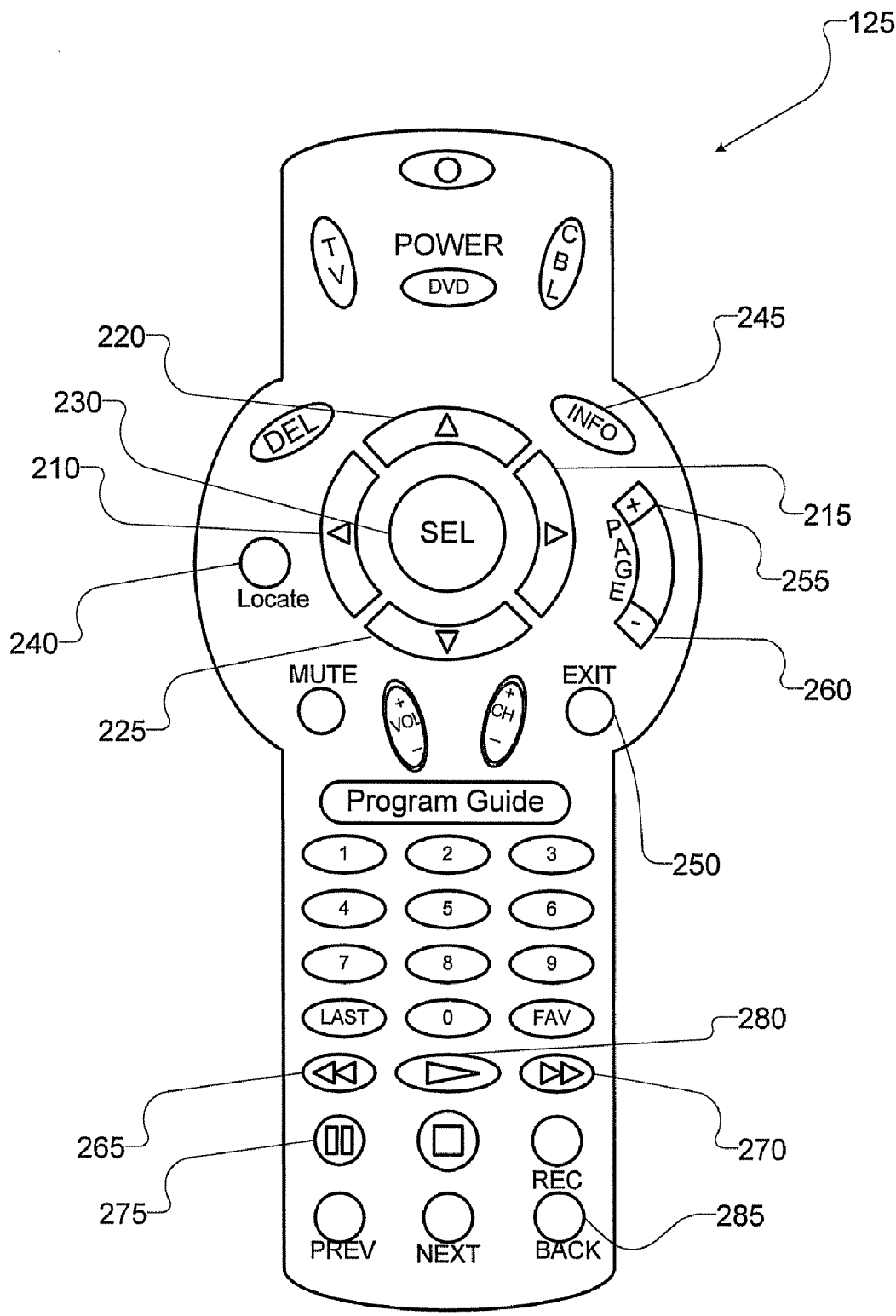
FIG. 2 illustrates an exemplary user input device.

An exemplary user input device 125 is illustrated in FIG. 2. User input device 125 may include a series of navigation keys, such as directional arrows 210-225 and a "select" key 230. User input device 125 may additionally or alternatively include any of a number of mechanisms for providing input such as scroll wheels, dials, joysticks, stroke pads, pointers, etc. that can be used to navigate, to indicate a desired position on a graphical user interface, or to indicate an intended selection. The user input device 125 may further include functional keys, such as a "locate" key 240, or an info key 245, which may be configured to cause the processing subsystem 105 to execute the location control application 155. The user may exit the application 155 using the exit key, 250. Further interaction with the processing subsystem 105 may be accomplished using traditional keys such as rewind 265, fast forward 270, pause 275 and play 280, as well as additional keys such as a "page up" key 255, or a "page down" key 260.

Returning to FIG. 1, media content processing subsystem 105 may be configured to communicate with and receive a signal or data stream (e.g., a media content stream) containing media content from a media content provider 110. The media content processing subsystem 105 and media content provider 110 may communicate using any one of a number of known communication technologies, devices, media, and protocols supportive of remote data communications including streaming media, including, but not limited to, cable networks, subscriber television networks, satellite networks, the Internet, intranets, local area networks, wireless networks (e.g., mobile telephone networks), optical fiber networks, Transmission Control Protocol ("TCP"), Internet Protocol ("IP"), File Transfer Protocol ("FTP"), Telnet, Hypertext Transfer Protocol ("HTTP"), Real Time Streaming Protocol ("RTSP"), socket connections, Ethernet, and other suitable communications networks and technologies. Media content may be provided to or within (e.g., from storage device 140) media content processing subsystem 105 according to any one of a number of known standards, including without limitation, standards promulgated by the Motion Picture Experts Group (MPEG).

Media content processing subsystem 105 may be configured to receive and/or process a media content stream provided by a media content provider 110, including causing media content, or one or more components (e.g., video and/or audio components) of media content, to be presented to a user, e.g. for viewing, in a user display device 120. The presentation of media content may include, but is not limited to, displaying, playing back, or otherwise processing media content, or one or more components of media content, such that it may be experienced by the user. For example, the media content processing subsystem 105 may provide a signal to device 120 so that device 120 may present (e.g., display) media content for experiencing by the user. Device 120 may be any one of a number of known playback devices, such as a television, a computer monitor, a cellular telephone, a hand-held computer, a digital video camera, etc.

Media content processing subsystem 105 is configured to receive commands from one or more access devices 130, e.g., a personal computer, wireless device, mobile phone, etc., in lieu of or in addition to user input device 125. Further, access devices 130 may be configured to access media content, stored and/or processed by processing subsystem 105. For example, media content that has been recorded by the processing subsystem 105 may be accessed and viewed on a personal computer. Moreover, an access device 130 may be used to program or otherwise control the operations of the processing subsystem 105 in lieu of or in addition to user input device 125.

Content server 115 may be configured to communicate with the media content processing subsystem 105 via a network 135, including communications links thereto, such as cables, wireless links, routers, switches, etc. Network 135 is generally a packet switched network and may include any of the Internet, an intranet or other private packet switched network, a wireless network, an optical fiber network, any other suitable network, or any suitable combination of any such networks. For example, media content provider 110 may broadcast or send digital streams of data packets (e.g., Internet Protocol ("IP") based data packets) from server 115 over network 135, which data packets can be received by the processing subsystem 105. Further, in some cases, content processing subsystem 105 may be connected directly to content server 115.

The processing subsystem 105 may include any combination of hardware, software, and firmware configured to process an incoming media content stream, e.g. an MPEG video stream. Hence, an exemplary processing subsystem 105 may include, but is not limited to, a set-top box ("STB"), stand-alone personal video recorder ("PVR") or digital video recorder ("DVR"), DVD player, video-enabled phone, personal computer, etc. For example, storage device 140 may include a DVR or PVR within content processing subsystem 105, e.g., an STB.

Storage device 140 may include one or more data storage media, devices, or configurations and may employ any type, form, and combination of storage media. For example, the storage device 140 may include, but is not limited to, a hard drive, network drive, flash drive, magnetic disc, optical disc, or other non-volatile storage unit. Various portions of media content, applications, such as location access control application 155, or a PVR application (not shown), and other data may be temporarily and/or permanently stored in the storage device 140. The storage device 140 of FIG. 1 is shown to be a part of the processing subsystem 105 for illustrative purposes only. It will be understood that the storage device 140 may additionally or alternatively be located external to the processing subsystem 105.

Storage device 140 may include one or more live cache buffers 145. Live cache buffer 145 may additionally or alternatively reside in memory 150 or in a storage device external to the processing subsystem 105. In some examples, media content may be temporarily stored in the live cache buffer 145 to facilitate viewing of the media content in one or more "trick play" modes. Trick play modes may include, but are not limited to, slow motion, fast motion, reverse play, fast forward play, instant replay, jumping, pausing of live broadcast, and scanning. When media content is temporarily stored in the live cache buffer 145, the user may designate that the media content is to be persistently stored in the storage device 140, e.g., for later retrieval by a user.

Application 155 shown in FIG. 1 is merely illustrative of the many different applications that may reside within the processing subsystem 105. For example, processing subsystem 105 may also include a personal video recording (PVR) application (not shown). A PVR application, also referred to as a digital video recording (DVR) application, refers to any application and/or device configured to record media content and/or provide for the viewing of media content in normal or trick play modes, e.g. rewind, fast forward, etc. A PVR application may be integrated into the processing subsystem 105, or may be a stand-alone unit.

Location access control application 155 may be initiated directly, upon input by a user explicitly requesting the application 155. Additionally, location access control application 155 may be initiated automatically, upon the occurrence of a some other event, such as user input implicitly requesting application 155. For example, a user may select an option to navigate through media content, e.g., fast-forwarding, rewinding, etc. Upon user initiation of such an operation, location access control application 155 may be automatically initiated. Further, the user may actuate a button on input device 125 or some other suitable input mechanism (e.g., an input device such as a keyboard, keypad, pointing device, etc. associated with access device 130) to cause an input to be provided to processing subsystem 105, which can receive and respond to an input by executing location access control application 155. In certain circumstances, actuation of the "locate" button 240, or some other button, on the input device 125 during presentation of media content may toggle between opening and closing the location access control application 155. In certain circumstances, actuation of the "play" button 280, or the "exit" button 250, may cause an open location access control application 155 to close. Location access control application 155 may be stored in memory 150, in storage device 140, or in live cache buffer 145. Additionally, location access control application 155 may be stored on a media content provider 110, and may be downloaded to processing subsystem 105 when the control application 155 is executed. Alternatively or additionally, control application 155 may execute from subsystem 105 to call remotely to, and receive responses from, processes on media content server 115.

Content processing subsystem 105 may include any computer hardware and/or instructions (e.g., software programs), or combinations of software and hardware, configured to perform processes described herein. In particular processing subsystem 105 may be implemented on one or more physical computing device and may employ any of a number of well known computer operating systems, including, but by no means limited to, known versions and/or varieties of the Microsoft Windows operating system, the UNIX operating system, Macintosh operating system, and the Linux operating system. Further, the operating system of content processing subsystem 105 may be a real time operating system (RTOS).

Accordingly, processes described herein may be implemented at least in part as instructions executable by one or more computing devices. In general, a processor (e.g., a microprocessor) receives instructions, e.g., from a memory, a computer-readable medium, etc., and executes those instructions, thereby performing one or more processes, including one or more of the processes described herein, such as processes implemented as instructions included in location access control application 155. Such instructions may be stored and transmitted using a variety of known computer-readable media.

A computer-readable medium (also referred to as a processor-readable medium) includes any medium that participates in providing data (e.g., instructions) that may be read by a computer (e.g., by a processor of a computer). Such a medium may take many forms, including, but not limited to, non-volatile media, volatile media, and transmission media. Non-volatile media may include, for example, optical or magnetic disks and other persistent memory. Volatile media may include, for example, dynamic random access memory ("DRAM"), which typically constitutes a main memory. Transmission media may include, for example, coaxial cables, copper wire and fiber optics, including the wires that comprise a system bus coupled to a processor of a computer. Transmission media may include or convey acoustic waves, light waves, and electromagnetic emissions, such as those generated during radio frequency ("RF") and infrared ("IR") data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

FIGS. 3-6 illustrate an exemplary media content instance 315 displayed according to program instructions in application 155 on a display 310, which display 310 may be presented on a user display device 120. Display 310 further presents the user with a location control pane 320. Location control pane 320 is generally used to display a series of individual images 335, and a selected image 345, which is indicated using a selection tool 325.

Figure 3:
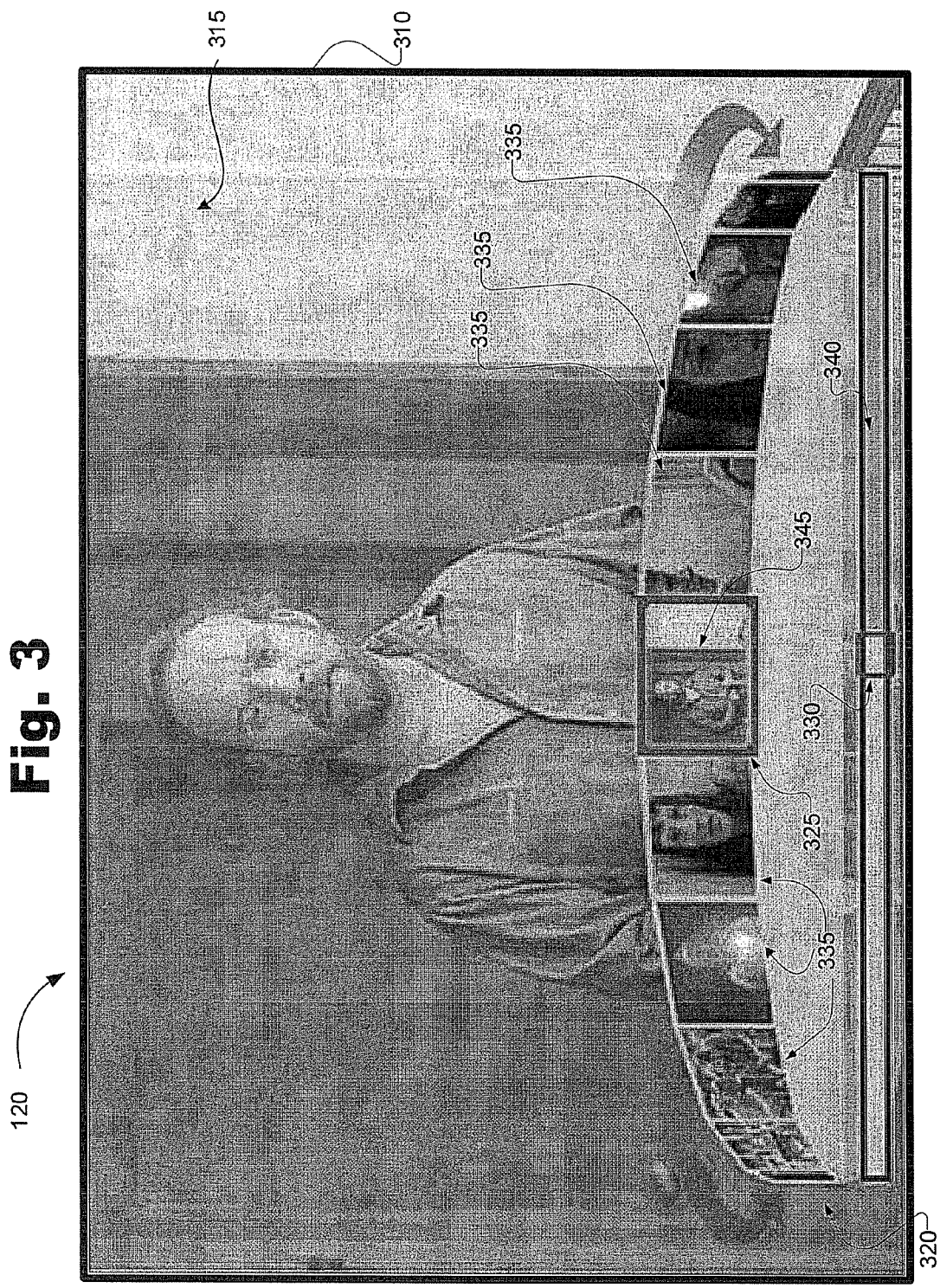
FIG. 3 illustrates an exemplary viewing screen with an exemplary location control pane overlaid thereon.

Turning now to FIG. 3, a video playback bar 340 represents an entire media content instance 315, and a progress indicator 330 which can represent, for instance, the location of an image currently displayed in the media content instance 315, or the selected image 345.

Images 335 presented in location control pane 320 may include a series of frames from a media stream or file. Generally such frames should be complete frames of video, such as, for example, intra-coded frames (I-frames) included in an MPEG video file or stream. For instance, when location control application 155 is instantiated, the processing subsystem 105 may select a first I-frame that is the I-frame located closest to the current location of a displayed media content instance 315. This first I-frame may then be selected as a base location in the MPEG stream from which to select additional images 335 to include in the control pane 320. Additional images 335 presented in the location control pane 320 may also include I-frames spaced apart from the first I-frame by an interval that is determined according to user input or that is predetermined and included in program instructions for application 155. The interval may be any kind of interval between frames of video, such as a temporal interval or an interval of a number of frames. It will be understood that frames having a given temporal interval may be readily identified by using a frame rate associated with a media stream.

The exemplary control pane 320 illustrated in FIG. 3 generally is displayed within display 310 of display device 120 in the shape of a "wheel", or a film reel, with a set of images 335 displayed as if spaced about the circumference of the wheel. Further, location access control pane 320 may be overlaid on a portion of the media content instance 315, as illustrated in FIG. 3. Control pane 320 as illustrated in FIG. 3 further includes a video playback bar 340, representing an entire media content instance 315, and a progress indicator 330 included on the video playback bar 340 to represent, for instance, the location of the image currently displayed in the media content instance 315, or the selected image 345.

Figure 4:
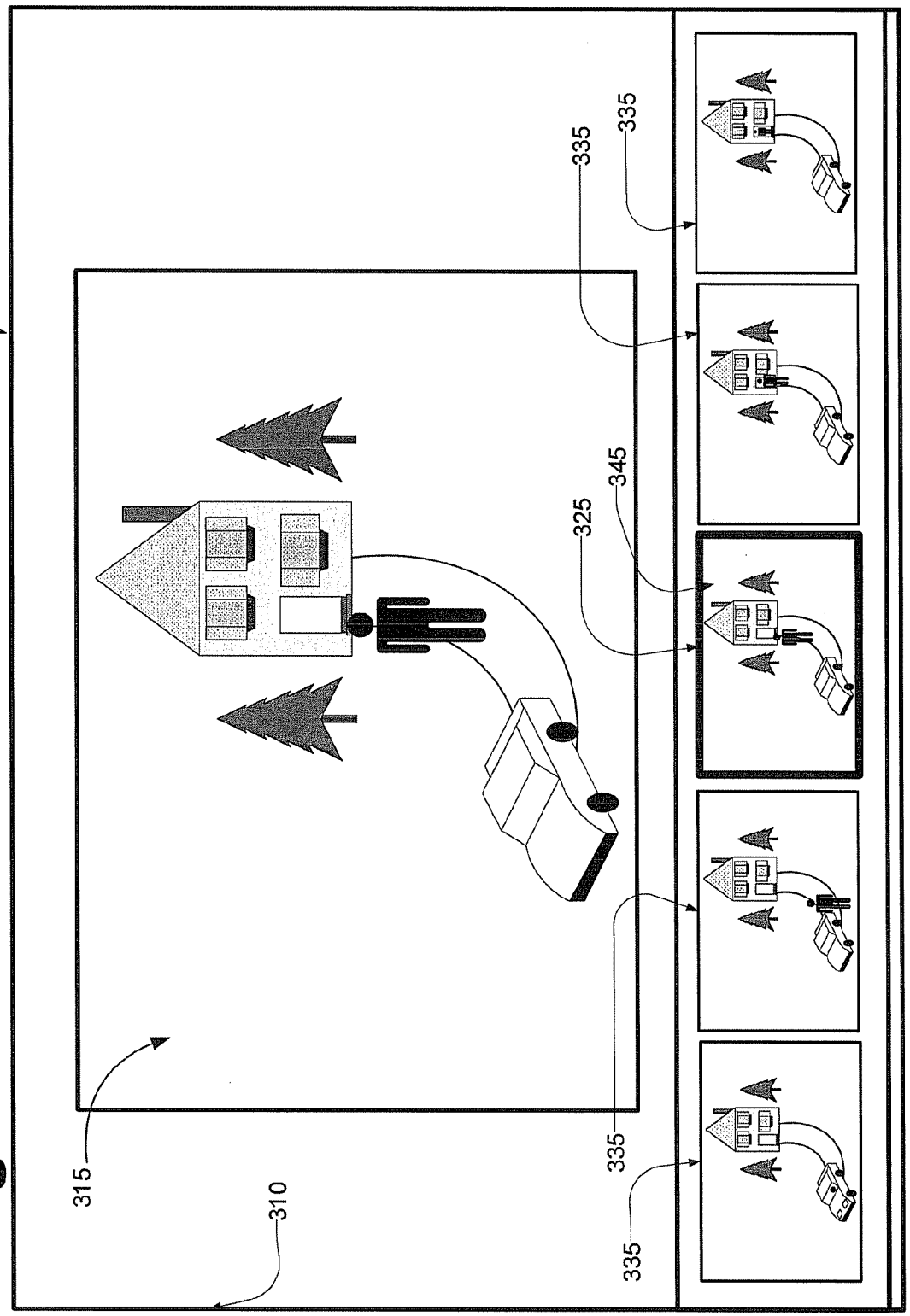
FIG. 4 illustrates an exemplary media content instance displayed with an exemplary location control pane.

The exemplary control pane 320 illustrated in FIG. 4 is displayed within a display 310. The media content instance 315 illustrated in FIG. 4 is according sized so that media content instance 315 is unobstructed by location control pane 320. The location control pane 320 illustrated in FIG. 4 is a horizontal bar located below the illustrated media content instance 315.

Figure 5:
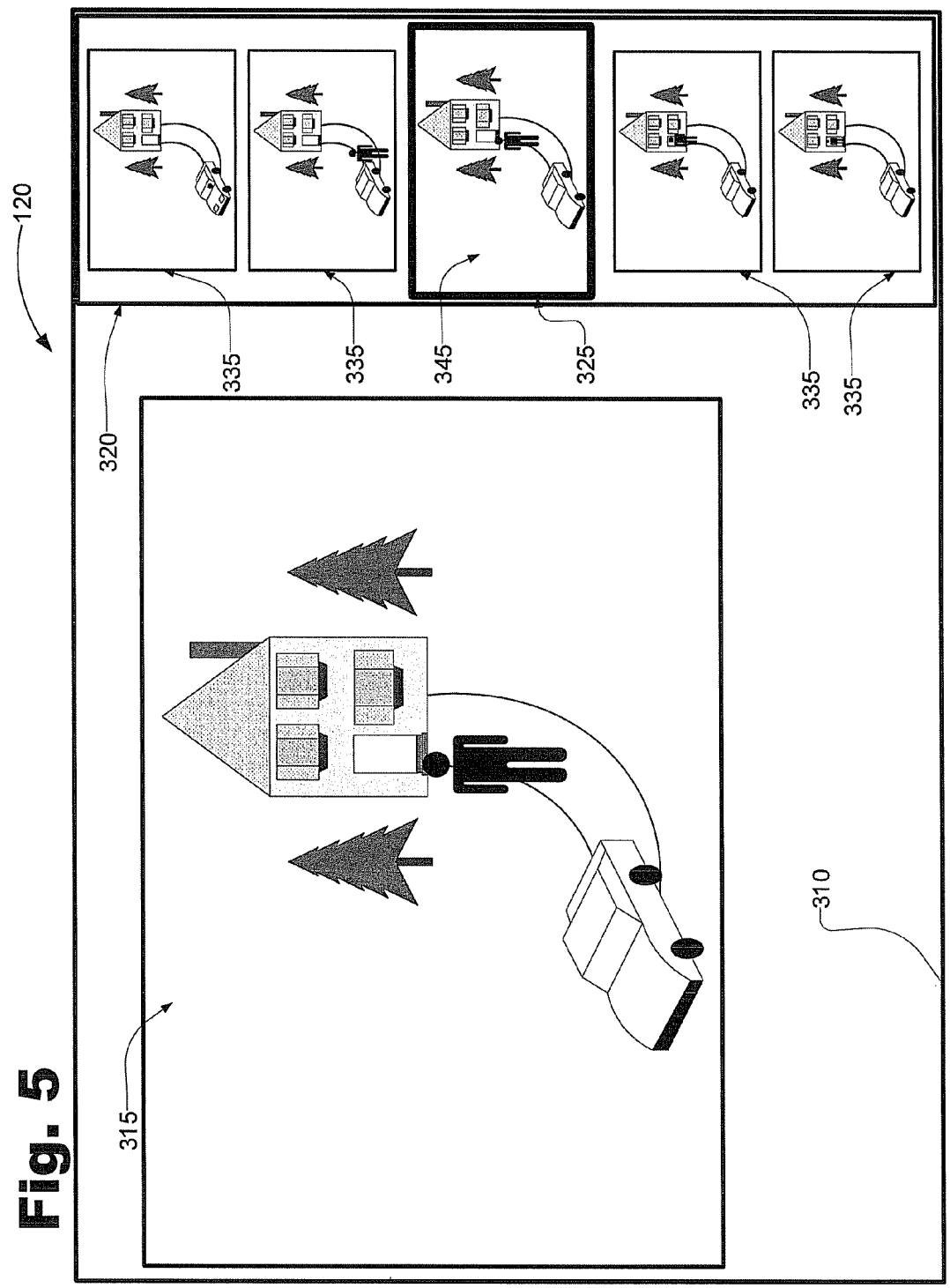
FIG. 5 illustrates the exemplary media content instance of FIG. 4 with an exemplary location control pane.

The exemplary control pane 320 illustrated in FIG. 5 is displayed as a vertical bar placed on the right side of media content instance 315, which media content instance 315 is sized so that control pane 320 does not generally obstruct media content instance 315. Selection tool 325 as illustrated in FIG. 5 is operative to magnify the selected image 345 relative to the other images 335 included in control pane 320. As a user navigates from one image 335 to another using selection tool 325, the image 335 which is currently a selected image 345 may be magnified slightly. When the user navigates away from a given image 335, the previous selected image 345 may return to a "pre-magnified" size.

Figure 6:
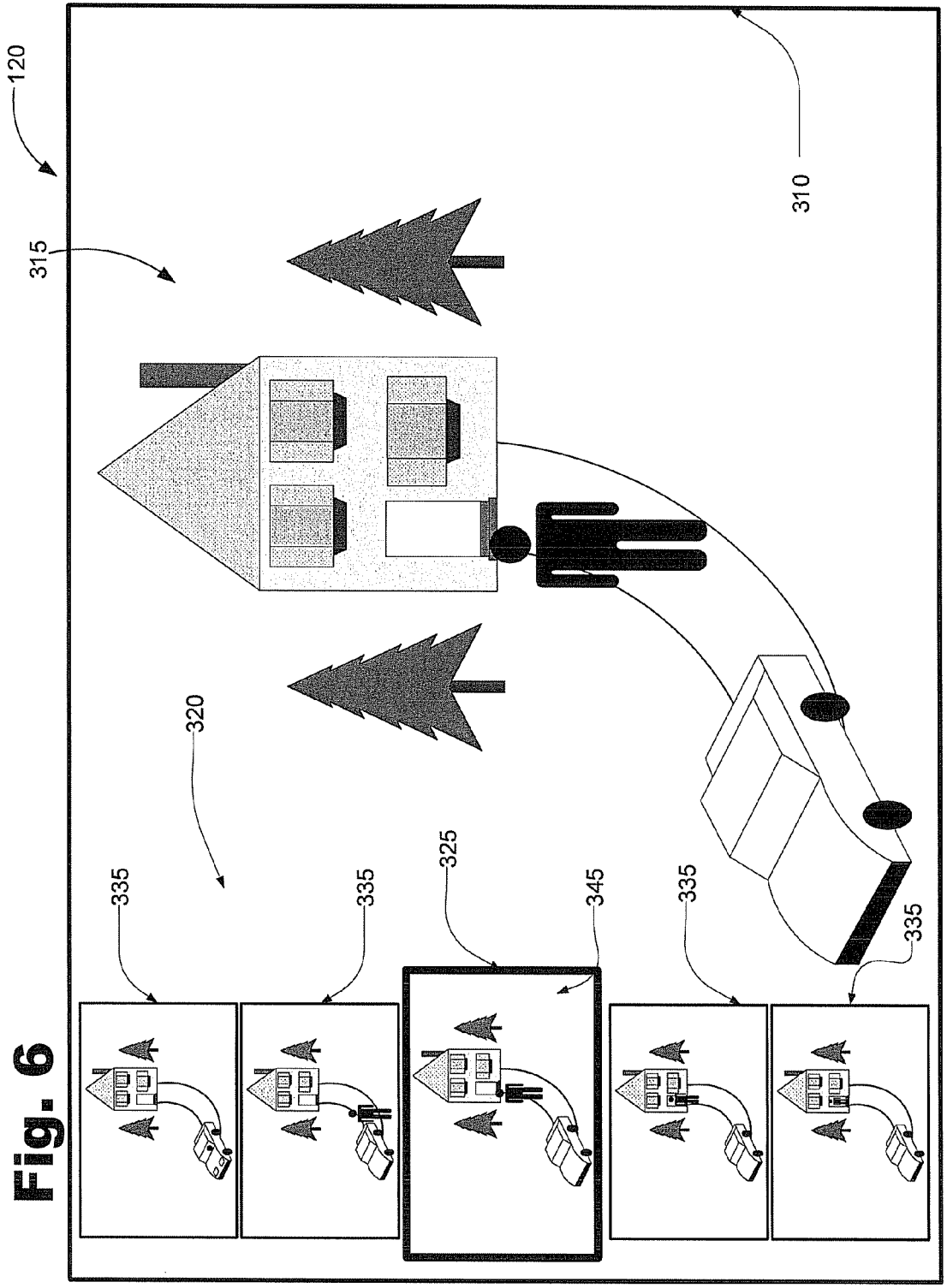
FIG. 6 illustrates the exemplary media content instance of FIG. 4 with an exemplary location control pane overlaid thereon.

FIG. 6 illustrates a further example of a location control pane 320. Location control pane 320 as illustrated in FIG. 6 is vertically overlaid across a portion of a media content instance 315 on a display 310, allowing media content instance 315 to retain an original size, although a portion of the media content instance 315 over which the location control pane 320 is overlaid may become obscured by the location control pane 320.

In general, location access control application 155 provides the user with convenient access to location access operations. Significantly, the user is able to access, navigate, consider, and utilize tools to enhance and/or complement the viewing experience, while a media content instance 315 continues to be presented. For example, the user is able to launch and make use of location access control pane 320 without having to leave the presentation of media content instance 315.

When the user makes a selection (e.g. selects locate button 240) on user input device 125 to initiate location access control application 155, control pane 320 including images 335 is displayed, including the selected image 345 indicated by the selection tool 325. The user can then navigate the displayed images 335 (e.g. by using the left and right arrow keys, 210 and 215), thereby selecting another image 335. As the user moves the selection tool 325 from one image 335 to another, the location access control pane 320 may be altered in response to such movement of tool 325. For example, the location control pane 320 in FIG. 3 may "turn," like a revolving film reel, such that the selection tool 325 remains in the center of the pane 320 with the images 335 changing position relative thereto. In addition, as selection tool 325 in essence traverses the series of displayed images 335, images 335 may be shifted, new images 335 may be added and existing images 335 removed, to allow the user to locate a desired frame or location within a media content instance 315 using the limited number of concurrently displayed images 335.

A user can navigate a location control pane 320, e.g., using one or more of directional arrow buttons 210-225 on user input device 125. Additionally, the user may navigate location control pane 320 using "fast forward" and "rewind" buttons 270 and 265 as well as other buttons such as "scene skip" buttons (not illustrated in FIG. 2) that allow for navigation according to indexing within a media stream or file, e.g., navigation from track to track on a DVD. "Scene skip" buttons, or the "fast forward" and "rewind" buttons 270 and 265 may be configured to permit a user to navigate images 335 quickly and efficiently. For example, whereas a directional arrow may move the image selection tool 325 by one image 335 with each button selection, the "fast forward" 270 arrow may cause selection tool 325 to traverse multiple images 335 with each button selection. For example, if a location control pane 320 includes a first series of ten images 335, selecting the "fast forward" 270 button may move selection tool 325 by ten images 335 in a given direction, providing the user with a subsequent set of images 335 subsequent to display of a first set of images 335.

Location control pane 320 may be configurable by a user of processing subsystem 105. In particular, location access control application 155 may include options that enable a user to choose different parameters for location control pane 320. For example, the user may select a style parameter for a location control pane 320, such as a wheel-shaped pane 320 as shown in FIG. 3, a horizontal bar-shaped pane 320 as shown in FIG. 4, or a vertical bar-shaped pane 320 as shown in FIG. 5. Configurable parameters for location control pane 320 further include the size of images 335 displayed in location control pane 320, the position at which a control pane 320 will be displayed in display 310 (e.g. overlaid upon, or adjacent to, a media content instance 315), etc. User-configured parameters may accordingly govern, for example, a preference for a location access control pane 320 to include five images 335 presented horizontally, overlaid along a bottom portion of a media content instance 315 as shown in FIG. 4. Alternatively, a second user's settings may indicate a preference for a location access control pane 320 to include twenty images 335 presented in a four-image by five-image array over substantially all of a display 310 (not shown in any Figure). In addition to parameters that govern a display and configuration of control pane 320, a user may be provided with options for assigning input commands to location control pane 320, e.g., assigning buttons of user input device 125 to perform certain operations.

Accordingly, a user can configure control pane 320 in a manner that will minimize the interference that location control pane 320 may have on the viewing habits and preferences of the user. The user-configured parameters may be provided in a variety of ways, such as through a menu or similar graphical user interface provided according to program instructions included in location control application 155, which may receive input provided through user input device 125 or device 130. User-parameters may be stored, for example, in storage device 140 and retrieved for use into memory 150.

The following description of FIGS. 7-10 discusses certain steps executed from the perspective of processing subsystem 105 and location control application 155. However, it is to be understood that processing subsystem 105 and location control application 155 may communicate with media content server 115, which may carry out certain steps, and return information to processing subsystem 105 and location control application 155.

Figure 7:
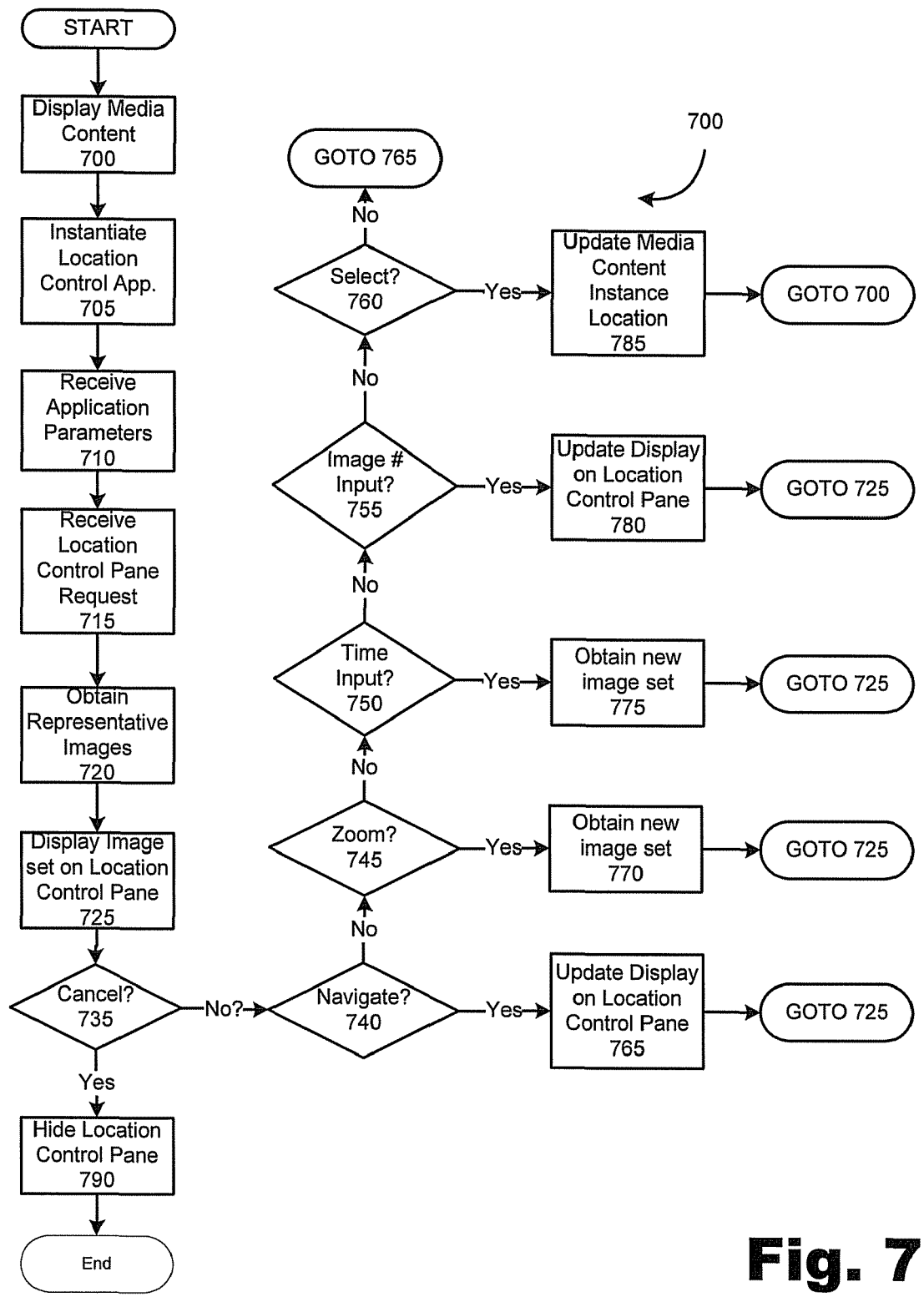
FIG. 7 illustrates an exemplary process for providing a location access control application.

FIG. 7 illustrates an exemplary process for providing location access control pane 320 together with a presentation of a media content instance 315. Certain user inputs are described with respect to FIG. 7 as provided through user input control device 125, but could also be provided through an access device 130. Similarly, presentations of media content instances 315, location control pane 320, etc., could be in a display of access device 130.

In step 700, processing subsystem 105 presents a media content instance 315 to the user. The media content instance 315 may include, but is not limited to, a video stored on a DVD, a program stored on a PVR, or a streaming video-on-demand program, etc., as mentioned above.

Next, in step 705, location control application 155 is instantiated, e.g., according to a user selection of a dedicated button in user input control 125, selection of a menu option presented in device 120, etc. Further, location control application 155 could be instantiated concurrent with step 700 upon user access of a media content instance 315 through processing subsystem 105. Instantiation of application 155 can include loading the application 155 from a memory 150 or storage device 140 of the processing subsystem 105, or may include downloading application 155 from a media content provider 110 into memory 150. Providing application 155 as a temporary download may be especially useful where storage 140 and/or memory 150 are limited.

Next, in step 710, application 155 in processing subsystem 105 receives parameters for location control application 155. As mentioned above, parameters may be configured by a user, and may include settings such as a number of images 335 to present when location control pane 320 is displayed, a size of images 335 in control pane 320, the style of a location control pane 320, etc.

Next, in step 715, application 155 in processing subsystem 105 receives a request for location control pane 320 via a user input device 125.

Next, in step 720, the images 335 requested in step 715 are obtained by processing subsystem 105. Exemplary processes for obtaining a set of images 335 are described below with reference to FIGS. 8 and 9.

Next, in step 725, the images 335 obtained in step 720 are displayed in location control pane 320 in display 310. Location control pane 320 may be presented in display 310 in a variety of ways, e.g., as described above with respect to FIGS. 3-6.

Next, in step 735, if user input has been received indicating that the user has selected to exit the location control pane 320, e.g., by pressing a button on input device 125 configured to cancel control pane 320, the processing subsystem 105 removes the location control pane 320 from the display device 120, at step 790, and the process of FIG. 7 ends. However, if user input has not been received indicating that the user has selected to exit the location control pane 320, step 740 is executed next.

At step 740 application 155 determines if user input has been received indicating that the user has selected to navigate the displayed images 335. For example, image selection tool 325 may be moved in response to a user input, in a direction indicated by the user on user input device 125, relative to the displayed images 335. For example, if a user selects right arrow 215, image selection tool 325 may move from a currently selected image 345 to an image 335 immediately to the right of a currently selected image 345. In another example, the image selection tool 325 may remain substantially still while the displayed images 335 move relative thereto. For example, if the user pressed the right arrow 215, the displayed images 335 may shift to the left by one image 335. Consequently, an image 345 which was initially selected by the image selection tool 325 will shift and subsequently be located to the left of the image selection tool 325, while the image selection tool 325 remains in place on the location control pane 320. If user input has been received indicating that the user has selected to navigate the displayed images 335, step 765 is executed next. Otherwise, step 745 is executed next.

In step 745, application 155 determines whether the user has requested a "zoom" operation. If so, step 770 is executed next. Otherwise, step 750 is executed next. An exemplary process for obtaining a zoomed set of images 335 is discussed below, in regard to in FIG. 10.

In step 750, application 155 determines whether the user has requested to advance the playback of the media content instance 315 to a specific temporal location within the media content instance 315. If so step 775 is executed next. Otherwise, step 755 is executed next.

In step 755, application 155 determines whether input has been received indicating a number of an image 335 presented on the location control pane 320. For example, if location control pane 320 displays a set of nine images 335, the user may select one of the images 335 by inputting the associated number (e.g., 1 through 10) using the user input device 125. If the user inputs a number associated with a displayed image 335, step 780 is executed next. Otherwise, step 760 is executed next.

In step 760, application 155 determines whether an image 345 has been selected at which to begin, skip to, or resume playback of media content instance 315. If so, step 785 is executed next. Otherwise, step 765 is executed next.

In step 765, which, as stated above, may follow step 740; application 155 updates control pane 320 according to navigation input received as described in step 740. In addition to the motion of images 335 or an image selection tool 325, application 155 may additionally update control pane 320 to include additional images 335 not originally presented to the user when the image control pane 320 is first displayed. For example, if seven images 335 are displayed initially, selection tool 325 may be placed on a chosen center image 345. If image selection tool 325 is moved to the right three times, selected image 345 becomes the rightmost image in control pane 320. If a user selects to move selection tool 325 further to the right, new images 335 must be presented on the control pane 320 to allow for continued navigation. Accordingly, new images 335 may thus be loaded in step 765. In any event, step 725 is executed following step 765.

In step 770, application 155 obtains a new image set as the result of a zoom operation. An exemplary process for obtaining a zoomed set of images 335 is discussed below, in regard to FIG. 10. Step 725 is executed following step 770.

in step 775, application 155 instructs processing subsystem 105 to advance media content instance 315 to the requested temporal location, e.g. ten minutes ahead, fifteen minutes after the beginning of the media content instance 315, etc. Application 155 then acquires images 335 associated with the selected temporal location. Such images 335 may be gathered in accordance with either of the processes described below with reference to FIGS. 8 and 9. Obtained images 335 will then be presented in step 725, which is executed following step 775.

In step 780, the application 155 places selection tool 325 upon the selected image 345 of step 755, and obtains a new set of images 335 centered around the selected image 345. The new set of images 335 may be obtained in accordance with either of the processes described below with reference to FIGS. 8 and 9. Further, upon receiving a request for a given image number, application 155 may instruct processing subsystem 105 to resume playback of the media content instance 315 at the location specified by the user. Newly obtained images 335 will be presented in step 725, which is executed following step 780.

In step 785, application 155 instructs processing subsystem 105 advances the media content instance 315 to the location indicated by the selected image 345, at step 785. The media content instance 315 then is displayed from this point to the user at step 700, which is executed following step 785.

FIG. 8 illustrates an exemplary process for dynamically obtaining images 335 for a control pane 320. While certain steps in the process of FIG. 8 are discussed with reference to an MPEG file format, such references are meant to be illustrative only, and not limiting. The process of FIG. 8 assumes that location access control application 155 has been instantiated, whereupon it is necessary to obtain images 335 for location access control pane 320.

In step 810, application 155 determines the current playback location, sometimes known as the "read head line," in media content instance 315.

Next, in step 820, application 155 locates the I-frame nearest to the current media location. Various ways of locating such an I-frame are known. Alternatively or additionally, heuristics may be used that select an I-frame that is thought to be characteristic of the scene or portion of a video. In any event, the I-frame located in step 820 may be a first image 335 obtained for a set of images 335 included in control pane 320, and may be used to obtain other images 335 included in the set.

Next, in step 830, application 155 determines the appropriate offset or distance, e.g., in time, number of frames, etc., between images 335. As mentioned above, such determination may be based on user parameters, e.g., the number of images 335 to be presented, a length of a segment of media content instance 315 to be represented, etc. An offset may also be based on the length of a media content instance 315 that is being presented. For example, the user parameters may specify that location control pane 320 should include seven images 335, covering one quarter of media content instance 315. If the media content instance 315 is one hour long, then the seven images 335 should represent a fifteen minute period. Accordingly, the I-frame nearest the current location of the media content instance 315 will be the selected center image 345, with three images 335 on either side. Images 335 in this case accordingly are spaced according to intervals of two and a half minutes in media content instance 315. That is, application 155 determines the appropriate offset for this example as two and a half minutes.

In addition to the temporal offset described in the preceding example, images 335 may be offset from each other in other ways. For example, images 335 may be separated by a specific number of image frames, as has been mentioned. Moreover, offsets between images 335 need not remain constant. For instance, images 335 closer to the selected image 345 (e.g. adjacent images) may have a smaller offset than images 335 located further from the selected image 345 on the location control pane 320. Such varying offsets may be specified in user parameters or program instructions for application 155. Further, images 335 may be determined based on scene changes or based on sudden changes in audio volume according to known heuristics. Additionally, as discussed further below with respect to FIG. 9, selection of images 335 may be based on information supplied in metadata accompanying the media content instance 315.

Following step 830, next, in step 840, application 155 obtains representative images 335 using the appropriate offset determined in step 830. Application 155 may obtain images 335 in step 840 by identifying an I-frame representative of the location specified, i.e., by using methodologies similar to those used in step 820. Such an I-frame may be obtained from media content instance 315 stored in storage 140, or may be obtained from another media source, such as a DVD or the like. Additionally, an I-frame may be obtained by application 155 from a media content server 115, e.g., where processing subsystem 105 and/or application 155 communicates with server 115 to carry out certain of the steps discussed herein. I-frames or identification of I-frames may be obtained from any number of different sources, including a source not included in a video stream or file itself such as a separate file of images, a call to server 115, etc.

Next, in step 850, images 335 obtained in steps 820-840 are displayed in location control pane 320 at step 840.

Following step 850, the process described with reference to FIG. 8 ends.

FIG. 9 illustrates an exemplary process for obtaining images 335 for a control pane 320 according to metadata included in with a media content instance 315.

In step 905, processing subsystem 105 receives a selection for a media content instance, e.g., an input, provided via user input device 125, configured to view a movie stored on a DVD.

Next, in step 910, processing subsystem 105 retrieves the requested media content instance 315, e.g., from storage 140. As is known, digital media files generally include metadata including information such as a title, names of actors, a rating, a year of release, etc. Further, such metadata may include information concerning specific images 335 to be displayed in control pane 320, intervals according to which images 335 should be displayed, etc. The metadata could, in fact, include the images themselves as a digitally encoded image, such as a JPEG image or a GIF image. Accordingly, such metadata is also retrieved in step 910.

Next, in step 915, application 155 retrieves from media content instance 315 images 355 specified in the metadata retrieved in step 910.

Next, in step 920, the images 335 retrieved in step 915 are included in location access control pane 320, which is displayed in display 310.

Following step 920, the process of FIG. 9 ends.

FIG. 10 illustrates an exemplary process for obtaining a second set of images 335 based on a selection of a selected image 345 in a first set of images 335. The process of FIG. 10 is sometimes referred to as a process of "zooming" in or out.

As previously mentioned, a selected image 345 may be used to begin play of media content instance 315 at a location represented by the image 345. However, images 335 on a location control pane 320 may represent locations spaced according to intervals large enough that a user may not be able to precisely locate a specific desired location within the media content instance 315. Similarly, if the subsequent images 335 represent locations that are too closely spaced, a user may have to navigate an excessive number of images 335 to reach a desired location in media content instance 315. To address such situations, the user may have the option of "zooming in" or "zooming out" from a particular location. For example, if a user desired to access a location in media content instance 315 occurring between locations associated with selected image 345, and an image 335 immediately to the right of the selected image 345, the user may have the ability to "zoom in" on the selected image 345.

In step 1010, application 155 determines that a zoom command has been received, e.g., from user input device 125.

Next, in step 1020, application 155 determines the location of currently selected image 345 within media content instance 315, e.g., according to a frame number or some other mechanism for identifying a location within media content instance 315.

Next, in step 1030, application 155 determines the present offset, or interval between images 335, such offsets or intervals having been discussed above. This present offset may serve as a baseline for subsequent offsets, i.e., offsets that are re-calculated following a zoom command such as was received in step 1010.

Next, in step 1040, application 155 determines an appropriate offset for a new, "zoomed" set of images 335. The "zoomed" offset may be based in part on the previous offset. For example, a zoomed set of images 335 may represent a segment of media content instance 315, where the length of the segment is equal to the previous offset. For example, if the previous offset was five minutes, e.g., images 335 represented locations in media content instance 315 spaced at intervals of five minutes, a zoomed set of images 335 may include a set of images 335 representing a segment of media content instance 315 that has a total length of five minutes. Thus, if the zoomed set of images 335 includes five images 335, these images 335 may be spaced according to an offset of one minute. A subsequent zoom may include obtaining images 335 spaced apart by twelve seconds. Similarly, if input is received to zoom out from a selected image 345, the zoomed offset may be equal to the length of the segment of the media content instance 315 represented in the pre-zoomed location control pane 320.

Next, in step 1050, images 335 are obtained according to the new zoom offset. Such images 335 may be obtained, for example, using processes described above with reference to FIGS. 8 and 9.

Next, in step 1060, the zoomed set of images 335 may be included in control pane 320 in display 310.

Following step 1060, the process of FIG. 10 ends. It will be understood that this process may be repeated, i.e., a user may repeatedly perform both zooming in and zooming out, as desired, to efficiently reach a desired image location. For example, when a first image control pane 320 is displayed to the user, the user may choose to "zoom out" to view a broad segment of the media content instance 315. The user may then navigate the broad segment of the media content instance 315 to select an image 335 located near the desired location in the media content instance 315. The user may then choose to zoom in on the selected image 345 to thereby view a more narrow selection of the media content instance 315.

CONCLUSION

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claimed invention.

Accordingly, it is to be understood that the above description is intended to be illustrative and not restrictive. Many embodiments and applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their broadest reasonable constructions and their ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

What is claimed is:

1. A system, comprising a media content processing subsystem that is configured to:
   provide a media content instance for display, the media content instance including a first segment comprising a plurality of images;
   provide a location control pane for display with the media content instance;
   receive user-configured parameters for the display of the location control pane, the user-configured parameters indicating a specified position at which the location control pane is to be displayed in a display and a specified number of images to be displayed within the location control pane;
   receive a request to display the location control pane;
   determine, in response to the request, a first offset for the first segment based on a length of the first segment and the specified number of images to be displayed in the location control pane;
   identify, based on the first offset, a plurality of first images associated with locations within the first segment of the media content instance;
   retrieve the first images from the media content instance;
   provide the first images for display in the location control pane at the specified position in the display;
   receive an input selecting to navigate within the first images;
   in response to the input, identify a second segment of the media content instance, determine a second offset for the second segment based on a length of the second segment and the specified number of images to be displayed in the location control pane, and identify, based on the second offset, a plurality of second images associated with locations within the second segment of the media content instance;
   retrieve the second images from the media content instance; and
   provide the second images for display in the location control pane at the specified position in the display.

2. The system of claim 1, wherein one of the first segment of the media content instance and the second segment of the media content instance is the media content instance in its entirety.

3. The system of claim 1, wherein each of the first offset and the second offset comprises one of a time interval and a number of frames.

4. The system of claim 1, further comprising a display device that is connected to the media content processing subsystem.

5. The system of claim 1, wherein the media content instance is a digital video file formatted according to a standard of the Motion Picture Experts Group.

6. The system of claim 1, further comprising a storage subsystem, wherein the media content processing subsystem is further configured to retrieve the media content instance from the storage subsystem.

7. The method of claim 1, wherein the specified position at which the control pane is to be displayed is relative to the display of the media content instance in the display.

8. The method of claim 1, wherein the specified position overlies a portion of the display of the media content instance.

9. The method of claim 1, wherein the location control pane is displayed only in response to the request to display the location control pane, the request initiated by a user.

10. The method of claim 1, wherein the location control pane has a shape substantially similar to a wheel.

11. A method, comprising:
    providing a media content instance for display, the media content instance including a first segment comprising a plurality of images;
    receiving user-configured parameters for display of a location control pane, the user-configured parameters indicating a specified position at which the location control pane is to be displayed in a display;
    receiving a request to display a number of images in the location control pane;
    determining, in response to the request, a first offset for the first segment based on a length of the first segment and the number of images to be displayed in the location control pane;
    identifying, based on the first offset, a plurality of first images associated with locations within the first segment of the media content instance;
    retrieving the first images from the media content instance;
    providing the first images for display in the location control pane at the specified position in the display;
    receiving an input selecting to navigate within the first images;
    responding to the input by identifying a second segment of the media content instance, determining a second offset for the second segment based on a length of the second segment and the number of images to be displayed in the location control pane, and identifying, based on the second offset, a plurality of second images associated with locations within the second segment of the media content instance;

retrieving the second images from the media content instance; and providing the second images for display in the location control pane at the specified position in the display.

12. The method of claim 11, wherein one of the first segment of the media content instance and the second segment of the media content instance is the media content instance in its entirety.

13. The method of claim 11, embodied as computer-executable instructions included on a tangible computer-readable medium.

14. A system, comprising a media content processing subsystem that is configured to:

provide a media content instance for display, the media content instance including a segment comprising a plurality of images;

provide a location control pane for display with the media content instance;

receive user-configured parameters for the display of the location control pane, the user-configured parameters indicating a specified position at which the location control pane is to be displayed in a display and a specified number of images to be displayed within the location control pane;

determine an offset for the segment based at least in part on the specified number of images to be displayed in the location control pane, the offset being one of: a time interval and a number of frames;

identify a plurality of first images from the plurality of images of the segment according to the offset;

retrieve the first images from the media content instance; and provide the first images for display in the location control pane at the specified position in the display.

15. The system of claim 14, wherein the media content processing subsystem is further configured to:

receive an input selecting to navigate within the first images;

in response to the input, identify a second segment of the media content instance and a second offset, the second offset then being used to identify a plurality of second images associated with locations within the second segment, wherein the second offset is one of: a time interval and a number of frames;

retrieve the second images from the media content instance; and provide at least some of the second images for display in the location control pane at the specified position in the display.

16. A method, comprising:

providing a media content instance for display, the media content instance including a first segment comprising a plurality of images;

providing a location control pane for display with the media content instance;

receiving user-configured parameters for display of the location control pane, the user-configured parameters indicating a specified position at which the location control pane is to be displayed in a display and a specified number of images to be displayed within the location control pane;

determining a first offset for the first segment based at least in part on the specified number of images to be displayed in the location control pane, the first offset being one of: a time interval and a number of frames;

identifying a plurality of first images from the plurality of images of the first segment according to the first offset;

retrieving the first images from the media content instance; and providing the first images for display in the location control pane at the specified position in the display.

17. The method of claim 16, further comprising:

receiving an input selecting to navigate within the first images;

responding to the input by identifying a second segment of the media content instance and a second offset, the second offset then being used to identify a plurality of second images associated with locations within the second segment;

retrieving the second images from the media content instance; and providing at least some of the second images for display in the location control pane at the specified position in the display;

wherein the second offset is one of a time interval and a number of frames.

18. The method of claim 16, further comprising:

receiving an input selecting to change a zoom magnification level of the first images;

responding to the input by identifying a second segment of the media content instance and a second offset based at least in part on the zoom magnification level, the second offset then being used to identify a plurality of second images associated with locations within the second segment;

retrieving the second images from the media content instance; and providing at least some of the second images for display.

19. The method of claim 18, wherein the length of the second segment is equal to the first offset.

20. The method of claim 16, wherein the determining of the first offset for the first segment is further based on a length of the first segment of the media content instance.

21. The method of claim 20, wherein the length of the first segment is a user parameter configured by a user.

22. The method of claim 16, further comprising receiving a request to display the specified number of images within the location control pane, wherein the determining of the first offset, the identifying of the plurality of first images, the retrieving of the first images, and the providing of the first images for display in the location control pane are performed dynamically in response to the request to display the specified number of images within the location control pane.

* * * * *